Oct. 6, 1970        E. B. REDDICK        3,532,309
FISHING POLE HOLDER
Filed April 1, 1968        3 Sheets-Sheet 1
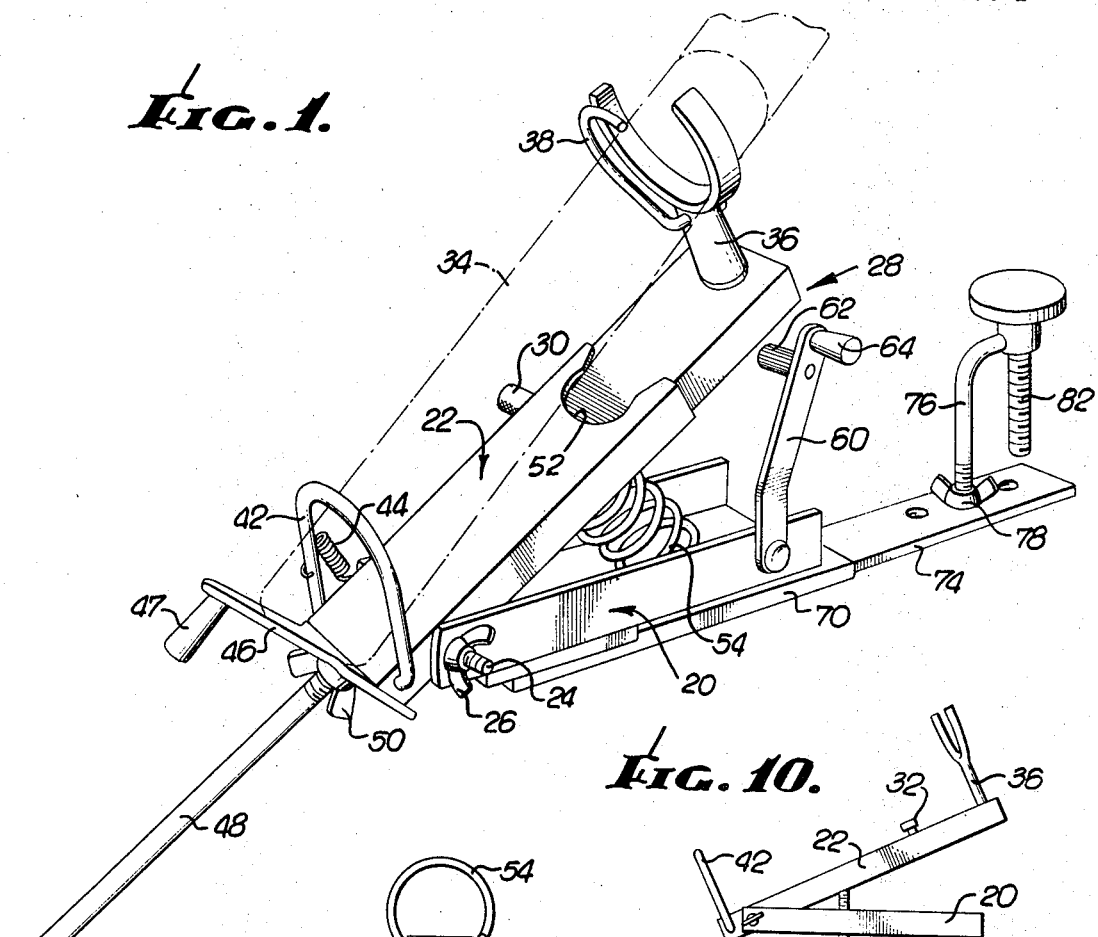
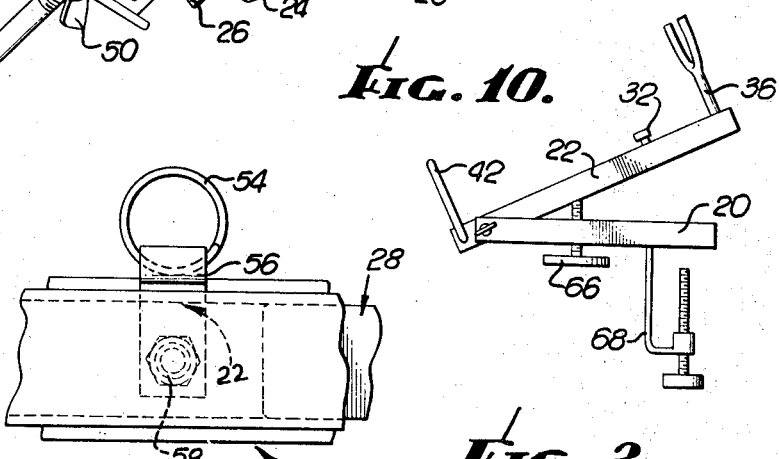
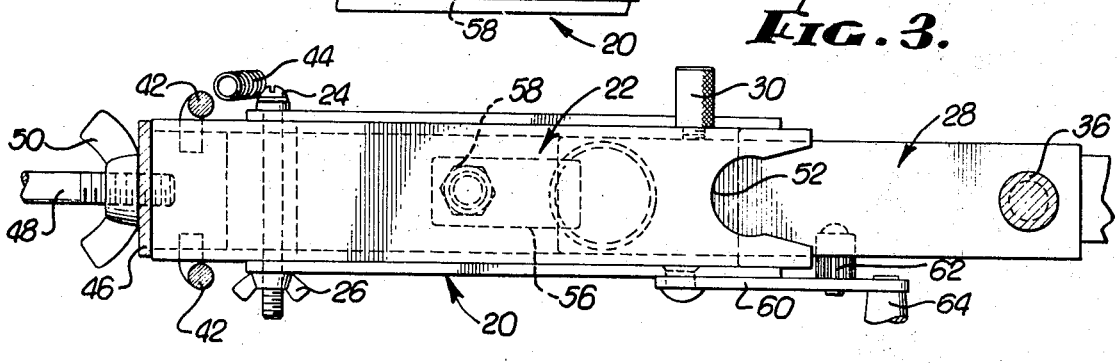
INVENTOR.
EDWARD B. REDDICK
By Ronald L. Juniper
ATTORNEY.

Oct. 6, 1970  E. B. REDDICK  3,532,309
FISHING POLE HOLDER
Filed April 1, 1968  3 Sheets-Sheet 2
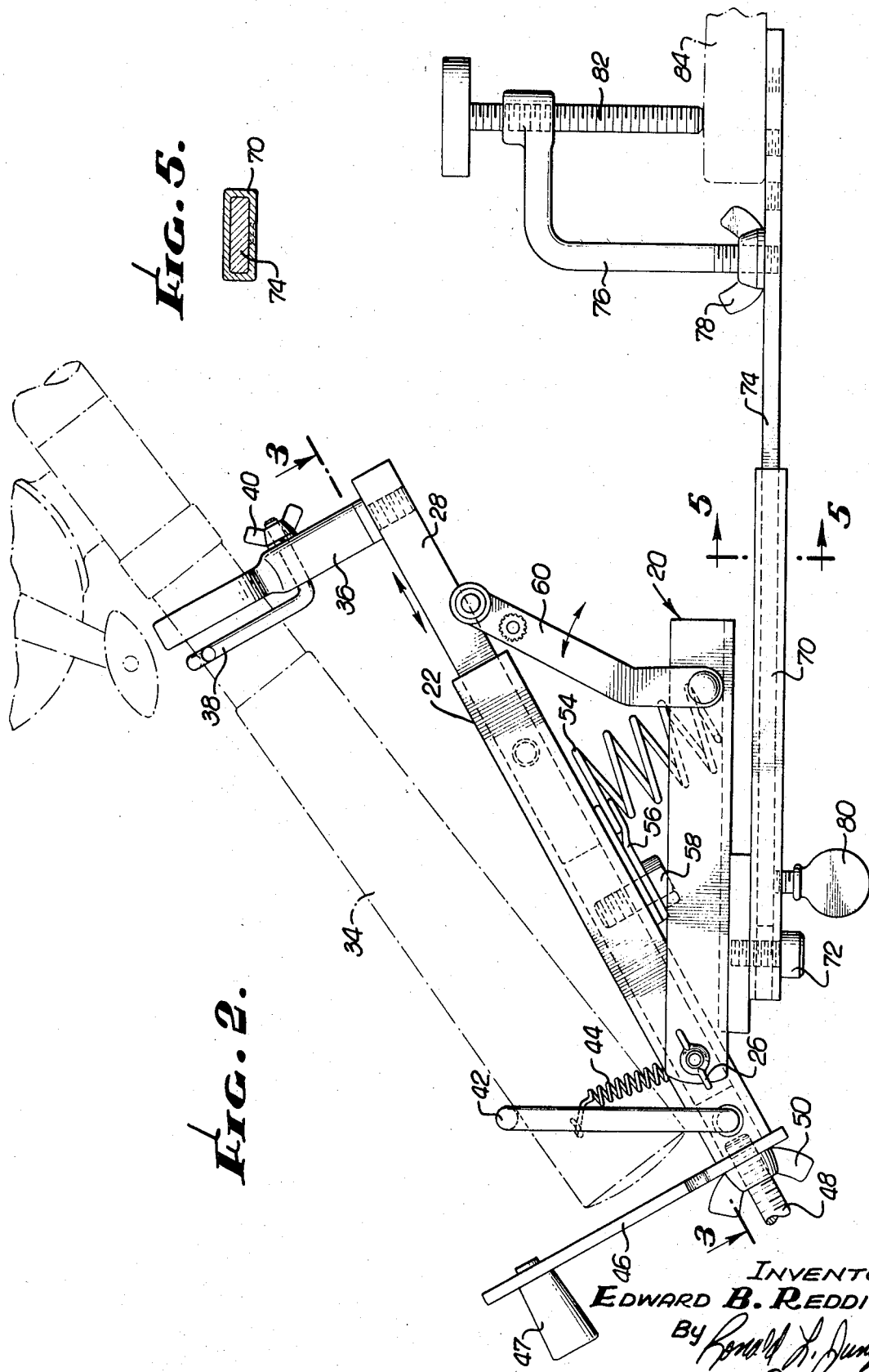
INVENTOR.
EDWARD B. REDDICK
By Ronald L. Juniper
ATTORNEY.

Oct. 6, 1970  E. B. REDDICK  3,532,309
FISHING POLE HOLDER
Filed April 1, 1968  3 Sheets-Sheet 3
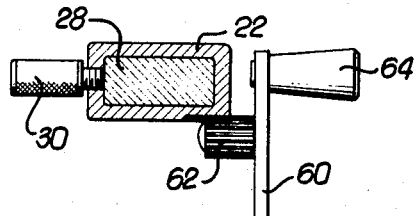
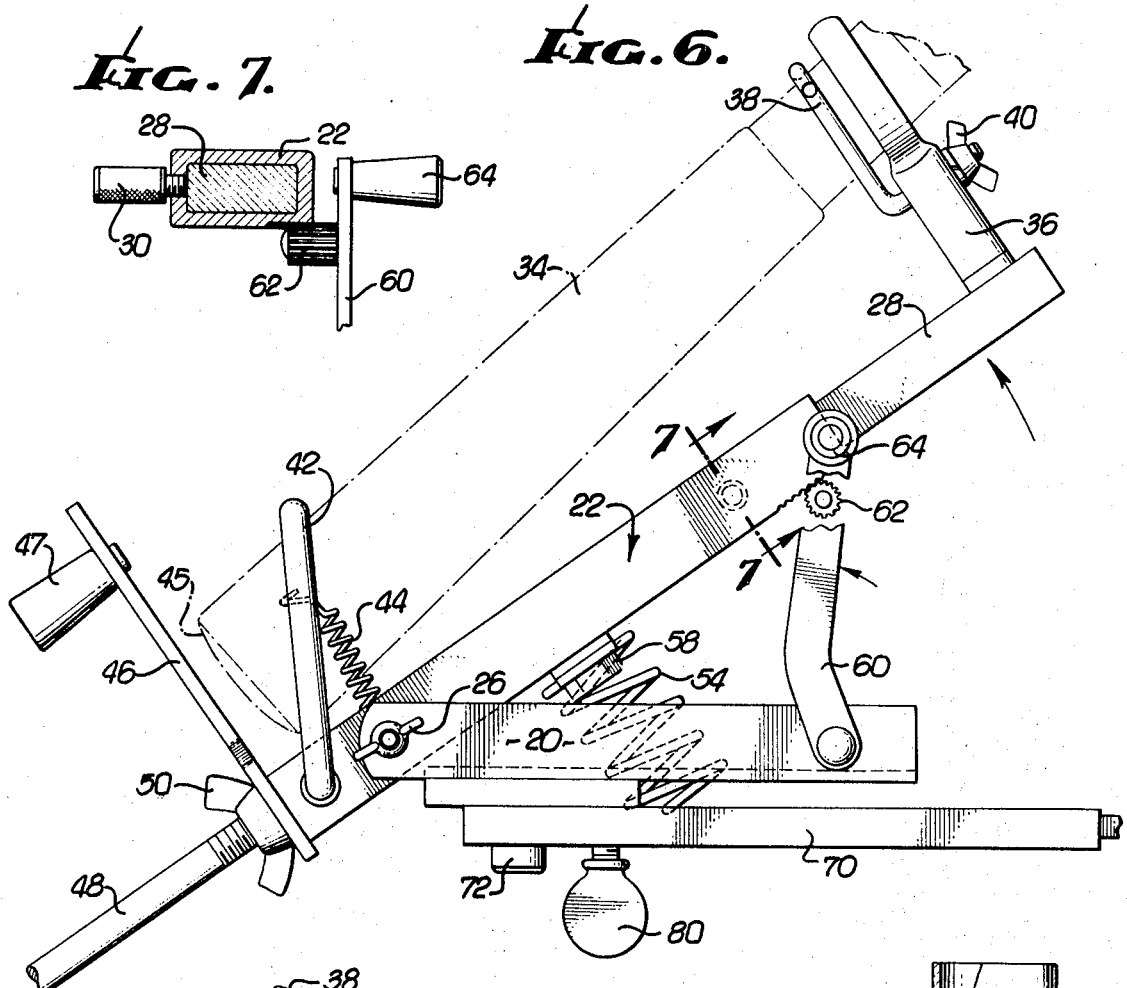
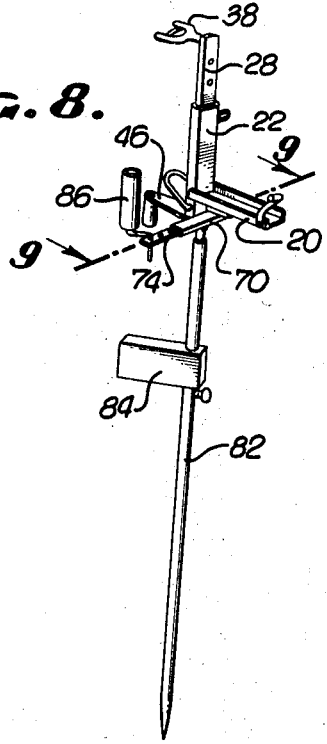
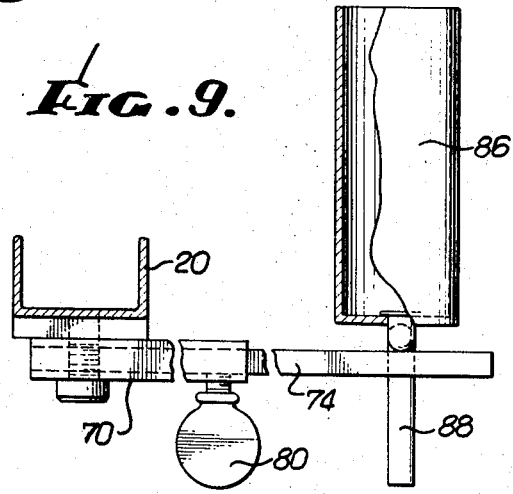
INVENTOR.
EDWARD B. REDDICK
By Ronald L. Juniper
ATTORNEY.

United States Patent Office 3,532,309
Patented Oct. 6, 1970

3,532,309
FISHING POLE HOLDER
Edward B. Reddick, 8418 Virginia Ave.,
South Gate, Calif. 90280
Filed Apr. 1, 1968, Ser. No. 717,510
Int. Cl. A01k 97/10
U.S. Cl. 248—42                    8 Claims

ABSTRACT OF THE DISCLOSURE

A fishing pole holder which includes a hollow support plate within which is carried a slidably mounted extension block which can be secured in selected extended positions. The support plate in combination with the extension block have fishing pole holding elements mounted on their top surface. A base plate is pivotally connected to one end of the hollow support plate and is provided with inclination adjusting members to vary the angle between the support plate and the base plate. A clamping member which may include an adjustable extension is ordinarily secured to the base plate and accessories such as a sand spike and extra pole holders may be attached to the device.

BACKGROUND OF THE INVENTION

A multitude of devices have been developed which have the primary purpose of providing a rest support for a fishing pole. Most of such devices have some means for holding a fishing pole in place and means for readily releasing the pole when a fish strikes and manual playing is needed to hook and pull the fish in.

The conditions and types of fishing vary so enormously that fishing pole holding devices more or less have been designed with a special type of fishing in mind. That is, for fresh water river bank fishing or salt water surf fishing a ground spike mounted holder would be deemed appropriate whereas for boat or pier fishing a holder having a clamping device is needed. Hence, a fisherman who fished in a number of different ways would require several different types of holders to accommodate his needs.

Therefore a primary object of this invention is to provide a fishing pole holder which is readily adapted for use under a number of different conditions and types of fishing.

Another object of this invention is to provide a fishing pole holder which is easily adjusted and provided with a number of optional attachments so that it can be adapted for use in a variety of different fishing situations.

Still another object of this invention is to provide a fishing pole holder which can be readily assembled and disassembled.

A further object of this invention is to provide a fishing pole holder which includes a telescoping adjustable position support that varies the leveraged resilient play of a pole held therein.

A still further object of this invention is to provide a fishing pole holder which has an adjustable inclination support which, optionally, may be resiliently mounted and an interchangeable variety of support mountings.

Other objects and advantages will be apparent from a review of the drawings and the following description of the invention.

BRIEF DESCRIPTION OF THE DRAWINGS

FIG. 1 is a perspective side view of an embodiment of a fishing pole holder in accordance with this invention which includes a number of adjustable features.

FIG. 2 is a side elevational view of the fishing pole holder as shown in FIG. 1.

FIG. 3 is a sectional view taken on line 3—3 of FIG. 2.

FIG. 4 is a fragmented view of a portion of the device as shown in FIG. 3 wherein the rocker spring is shifted outwardly from the base plate.

FIG. 5 is a cross-sectional view taken through line 5—5 in FIG. 2.

FIG. 6 is a side elevational view of the fishing pole holder as shown in FIG. 5 wherein the rocker spring is moved to its side position and the holding plate is elevated.

FIG. 7 is a fragmented cross sectional view taken on line 7—7 through the hollow holding plate as shown in FIG. 6.

FIG. 8 is a reduced in size perspective view of an embodiment of this fishing pole holder fitted with an elongated spike for driving it into the ground.

FIG. 9 is an enlarged view taken on line 9—9 of FIG. 8 showing the attachment of an additional cylindrical type pole holder to the basic device.

FIG. 10 is a side elevational view of an embodiment of a simplified form of the fishing pole holder with some of the attachments removed.

DETAILED DESCRIPTION

Referring now more particularly to the drawings, a fishing pole holder in accordance with this invention includes a base plate 20 which is pivotally connected at one end to a support plate 22 by means of a common threaded hinge bolt 24 which passes transversely through mating holes therein and is secured in place by screwing wing nut 26 onto the externally threaded end thereof. Preferably base plate 20 takes the form of an open rectangular channel member having a pair of spaced, parallel, upwardly turned side walls. The support plate 22 is formed as a hollow rectangular block which is open at one end only and is slightly narrower than the lateral space between the side walls of base plate 20.

A rectangular extension support block 28 which has a uniform cross-sectional shape mating with and slightly smaller than the interior cross-sectional, preferably uniform, shape of support plate 22 is slidably mounted within support plate 22. It can be telescoped to a multitude of positions and locked in a selected extended position by screwing in to bear against it lock stud 30 which is threadably engaged in a mating hole projecting through the side of support plate 22 in the form shown in FIGS. 1 and 3. In a like manner an extension support block is slidably mounted in the support plate 22 shown in FIG. 10, but in this form the lock stud 32 is threaded through a mating hole on the top of support plate 22 so as to be able to bear against the support block and hold it in place.

In order to hold the handle 34 of a fishing pole in position longitudinally aligned on top of support plate 22 and extension block 28, an upright sling-shot shaped pole holder 36 is secured in the upper top end portion of extension block 28 substantially perpendicular to the horizontal plane of block 28. When resting in the U-shaped portion of fishing pole holder 36, the handle 34 of a fishing pole is held loosely therein by turning a C-shaped closing wire 38, pivotally mounted through the base portion of pole holder 36 (and secured therein by wing nut 40), so that it can block the open upper portion of pole holder 36.

Pivotally secured on opposing sides of support plate 22, adjacent to the end remote from the end to which pole holder 36 is attached, is a wire loop 42 adapted to fit loosely over the handle butt 45 of a fishing pole and hold it in place. To allow easy removal of a handle butt 45 the loop 42 is held upright by means of a spring 44 connected to the side of support plate 22. Thus, when a fishing pole handle 34 is removed from holder 36 and the closing wire 38 is released, the loop 42 is sprung backwardly so as to allow easy removal of the fishing pole butt 45.

Also, to limit the rearward sliding of the fishing pole when it is inclined steeply toward a vertical position a pivotally mounted butt stop plate 46 is secured to the closed end of support plate 22 so that it can be shifted to a vertical blocking position by gripping handle 47 projecting outwardly therefrom to brace the handle butt 45 or be moved to a side position when not needed. As shown in FIG. 1, an extra long mounting bolt 48 is screwed into a mating hole in the closed end of support plate 22. This bolt 48 is aligned with the horizontal axis of support plate 22 and is used as a lever handle to wiggle a mounted fishing pole. An exterior threaded portion of the mounting bolt 48, adjacent to support plate 22, provides the means for securing stop plate wing nut 50 tightly enough against stop plate 46 to hold it in place.

The particular amount of leveraged support which is provided for a fishing pole handle 34 held in the subject device is controlled by extending or contracting the extension block 28 within support plate 22 so that pole holder 36 provides a different fulcrum support point according to the adjustment. When the extension block 28 is slid back into the support block 22, a cut-out key hole 52 in the top forward edge thereof allows the base of pole holder 36 to fit therein and thus permits nearly complete contraction of the extension block 28 into support plate 22 as shown in FIG. 10.

The angle at which a fishing pole is held by this invention is controlled by several different types of attachments which can be used, in some instances, in conjunction with each other or independently, if desired. One of these attachments which controls the fishing pole inclination angle is a cylindrically shaped rocker spring 54 attched to a short plate 56 which is, in turn, pivotally mounted by a bolt 58 to a forward bottom portion of support plate 22. This rocker spring 54 can be shifted to a forward position as in FIGS. 1, 2 and 3 to provide a resilient support when bearing against base plate 20 or be shifted out of the way to one side as in FIGS. 4 and 6.

In this latter instance an angle control arm 60 which is pivotally mounted to an outer side wall of base plate 20 in longitudinal movement parallel therewith extends upwardly so that a knurled horizontal bearing knob 62 which protrudes inwardly from an upper portion of arm 60 can provide frictional bearing support against the bottom of extension block 28. A handle knob 64 protruding from the upperside portion of arm 60 opposite from bearing knob 62 provides a grip for readily shifting arm 60 so that the bearing knob 62 supports plate 22 and the extension block 28 at different angles of inclination relative to base plate 20.

Another attachment which is capable of providing adjustable, inclined support for the support plate 22 is shown in FIG. 10 wherein an adjustable inclination bolt 66 is threaded vertically through a mating hole in the base plate 20 near its pivotal connection to support plate 22 so that its upper end bears against the bottom of support plate 22. Thus, by screwing inclination bolt 66 further in or out the corresponding angle of inclination of support plate 22 resting thereon is also changed relative to base plate 20.

In order to secure the device to a pier rail, boat or the like a clamping means attachment is provided. In the simplest form of this attachment, such as shown in FIG. 10, a C-type clamp 68 is attached to the bottom of base plate 20 in such a manner that it can be adjusted to secure the device in a predetermined position. A clamping attachment which provides greater flexibility is shown in FIGS. 1 and 3 wherein a hollow clamping plate 70 is secured by bolt 72 to the bottom of base plate 20 in longitudinal alignment therewith and an extension clamping bar 74 is slidably mounted therein so as to adjustably extend to selected positions. Thus, the C-type clamp 76 which is mounted vertically relative to the horizontal plane of bar 74 and secured in a mating hole therein by a wing nut 78. The amount of desired extension of bar 74 is selected and then bar 74 is locked in place by tightening screw 80 (which is matingly engaged in a threaded hole passing through the bottom of clamping plate 70) to bear against bar 74. The threaded screw portion 82 of C-type clamp 76 is then adjusted so that the device is held by gripping a supporting member such as plank 84 between it and the upper surface of extension bar 74.

When surf fishing or fishing from the shore of a lake or river bank, it is often desirable to hold the fishing pole in a particular location. To this end the subject invention is readily adapted by substituting an elongated sand spike 82 as in FIG. 8 in place of bolt 48. This sand spike 82 has a threaded end which mates with the internally threaded hole in the end of support plate 22 and an opposite pointed end to be driven into the ground where the device is being used to secure it in place. To facilitate driving sand spike 82 into the ground, a foot jamb 84 in the form of a rectangular block is attached to the middle side portion of sand spike 82.

In the form shown in FIGS. 8 and 9 the adaptability of this device to hold a number of fishing poles is illustrated by inclusion of an additional cylindrical type rod holder 86 supported by a rod 88 extending from the bottom thereof and fitted through one of a number of mating side portion of sand spike 84.

This invention can be used in a great variety of manners and the component parts may be separated for storage and carrying. The accessories shown can be attached even when not intended to be used or detached and stored to minimize bulk and weight. The embodiments and description heretofore disclosed are meant to be illustrative only and are not intended as limitations of this invention which comprehends all forms and uses within the spirit thereof.

I claim:
1. A fishing pole holder comprising: a base member; a hollow, elongated support plate pivotally connected at one end in longitudinal alignment with and on top of said base member, said support plate being formed with an open end remote from its connection with said base member; an extension block slidably mounted within said support plate and adapted to protrude from the open end thereof in alignment with the longitudinal axis of said support plate; locking means adapted to secure said extension block in selected positions relative to said support plate; an inclination adjusting arm member pivotally mounted on said base member and extending toward said support plate so that a portion of said arm provides a bearing support beneath said support member which changes the angle of inclination between said base member and support plate as said arm member is rotated around its pivotal mounting; a spring mounted between said base member and support plate, said spring movably mounted so that it optionally can be rotated out of bearing contact between said base member and support plate; an upright, generally Y-shaped holding member mounted on the top surface of the outer end of the extension block and an upright loop member mounted near the end of the support plate remote from said Y-shaped member, said loop member adapted to hold the butt end of a fishing pole handle and said Y-shaped member adapted to provide a fulcrum rest point for a fishing pole handle thereby providing a means for varying the leverage resiliency of a fishing pole held therein as said extension block position is changed to correspaondingly vary the relative distance between said loop member and said Y-shaped member; an adjustable fishing pole butt stop arm pivotally mounted on the end of said support plate adjacent to its connection with said base member, said butt stop arm laterally movable relative to said support arm and adapted to brace the handle butt of a fishing pole held on top of said support plate; a hollow elongated clamping plate secured to the bottom of said base plate, said clamping plate formed with an open end; a clamp extension block slidably mounted within said hollow clamping plate and adapted to protrude from the open end thereof; locking means to secure said clamp extension block in selected positions; and an adjustable C-type clamp mounted on said clamp extension block.

2. A fishing pole holder comprising a base member, a support member pivotally connected at one end in longitudinal alignment with and on top of said base member, an adjustable fishing pole butt stop arm pivotally mounted on the end of said support member adjacent to its connection with said base member, said butt stop arm laterally movable relative to said support arm and adapted to brace the handle butt of a fishing pole mounted in the holding means on top of said support member, adjustable clamping means secured to said base member which includes a hollow clamping plate formed with an open end and secured to the bottom of said base plate, a clamp extension block slidably mounted within said hollow clamping plate and adapted to protrude from the open end thereof, an adjustable C-type clamp mounted on said extension block and blocking means to secure said clamp extension block in selected positions.

3. A fishing pole holder comprising: A base member; a support member pivotally connected at one end in longitudinal alignment with and on top of said base member, said support member comprised of a hollow support plate open at one end; an extension block slidably mounted within said support plate and adapted to protrude from the open end thereof; means to secure said extension block in selected extended positions relative to said hollow support plate; inclination adjusting means extending between said support member and said base member to change the relative angle between them; and holding means secured on top of said support member and adapted to retain the handle of a fishing pole therein.

4. A fishing pole holder as defined in claim 3 wherein the holding means comprises an upright, sling shot, Y-shaped member mounted on the top surface of the outer end of the extension block and an upright loop member mounted near the end of the support plate remote from said Y-shaped member, said loop member adapted to hold the butt end of a fishing pole handle and said Y-shaped member adapted to provide the fulcrum rest point for a fishing pole handle thereby providing a means for varying the leveraged resiliency of a fishing pole held therein as said extension block position is changed to correspondingly vary the relative distance between said loop member and said Y-shaped member.

5. A fishing pole holder as defined in claim 4 wherein said loop member is spring mounted to facilitate receiving the butt end of a fishing pole handle and said Y-shaped member includes a movable closing means to secure in place a fishing pole handle resting thereon.

6. A fishing pole holder as defined in claim 3 which includes securing means for mounting additional fishing pole holders in combination with removable additional fishing pole holders mounted in said securing means.

7. A fishing pole holder as defined in claim 3 which includes an elongated bolt extending from the end of said support member, said bolt being in alignment with the longitudinal axis of said support member.

8. A fishing pole holder as defined in claim 3 which includes an elongated ground spike extending from the end of the support member adjacent its connection to said base member, said ground spike being formed with a pointed free end being in alignment with the longitudinal axis of said support member.

References Cited

UNITED STATES PATENTS

| | | | |
|---|---|---|---|
| 2,576,212 | 11/1951 | Carter | 248—42 |
| 107,869 | 10/1870 | Burnell | 248—348 |
| 180,806 | 8/1876 | Striegel | 248—397 |
| 2,199,034 | 4/1940 | Witczak | 248—42 X |
| 2,317,445 | 4/1943 | Davidson et al. | 248—42 X |
| 2,632,616 | 3/1953 | Heistand | 248—42 |

FOREIGN PATENTS

| | | |
|---|---|---|
| 248,521 | 3/1926 | Great Britain. |

MARION PARSON, Jr., Primary Examiner

U.S. Cl. X.R.

248—384, 397